United States Patent [19]

Scholl et al.

[11] 4,067,815

[45] Jan. 10, 1978

[54] AQUEOUS SOLUTIONS OF ALKALI SILICATES AND HYDROGEN PHOSPHATES

[75] Inventors: Hans-Joachim Scholl; Peter Markush, both of Cologne; Dieter Dieterich, Leverkusen, all of Germany

[73] Assignee: Bayer Aktiengesellschaft, Leverkusen, Germany

[21] Appl. No.: 774,293

[22] Filed: Mar. 4, 1977

[30] Foreign Application Priority Data

Mar. 24, 1976 Germany .............................. 2612415

[51] Int. Cl.² .............................................. C09K 3/28
[52] U.S. Cl. ................................. 252/8.1; 260/45.7 P
[58] Field of Search ..................... 252/8.1; 260/45.7 P

[56] References Cited

U.S. PATENT DOCUMENTS

| | | | |
|---|---|---|---|
| 2,593,400 | 4/1952 | Rakos | 252/8.1 UX |
| 2,861,012 | 11/1958 | Lowell | 252/8.1 X |

Primary Examiner—Leland A. Sebastian
Attorney, Agent, or Firm—Gene Harsh; Joseph C. Gil; William E. Parry

[57] ABSTRACT

The invention relates to aqueous solutions of alkali silicates and alkali hydrogen phosphates comprising:

from about 4 to 18%, by weight, of $K_2O$
from about 2 to 11%, by weight, of $Na_2O$
from about 3 to 10%, by weight, of $P_2O_5$
from about 12 to 21%, by weight, of $SiO_2$ based on the sum total of the constituents including water, wherein the ratio of the sum totals of the parts by weight, of $(K_2O + Na_2O):(P_2O_5 + SiO_2)$ is from about 1:0.9 to about 1:1.7 and has a solids content of from about 30 to about 50%, by weight. The solutions are homogeneous and stable and are particularly useful in improving the burning properties of organic/inorganic plastics. The invention also relates to a process for preparing these solutions which preferably involves introducing an aqueous alkali hydrogen phosphate solution into an aqueous silicate solution.

11 Claims, No Drawings

AQUEOUS SOLUTIONS OF ALKALI SILICATES AND HYDROGEN PHOSPHATES

BACKGROUND OF THE INVENTION

U.S. Pat. No. 2,284,248 teaches that concentrated solutions of highly siliceous alkali metal silicates (e.g. those containing at least two molecules of $SiO_2$ to one molecule of alkali metal oxide such as $K_2O$ or $Na_2O$) can be readily dehydrated by contact with various organic or inorganic dehydrating solutions e.g. strongly alkaline, strongly acid solutions, or solutions of metal or alkaline earth metal salts. The resulting gel-containing mixtures or cream-like suspensions are not homogeneous and are unstable in storage. Consequently substantial metering problems arise.

DESCRIPTION OF THE INVENTION

It has now surprisingly been found that aqueous silicate solutions, optionally containing soluble ingredients, such as borates, or polyol compounds, such as cane sugar, fructose, glucose, formose or glycerol, or alkali-soluble polymers, form clear storable solutions with aqueous alkali hydrogen phosphate solutions providing a certain concentration range is observed.

The present invention relates to novel aqueous solutions of alkali silicates and alkali hydrogen phosphates comprising:
- from about 4 to 18%, by weight, of $K_2O$
- from about 2 to 11%, by weight, of $Na_2O$
- from about 3 to 10%, by weight, of $P_2O_5$
- from about 12 to 21%, by weight, of $SiO_2$ based on the total of these constituents including water, wherein the ratio of the sum total of the parts, by weight, of $(K_2O + Na_2O):(P_2O_5 + SiO_2)$ is from about 1:0.9 to about 1:1.7 and has a solids content of from about 30 to about 50%, by weight, preferably from 40 to 45%, by weight. As is well recognized in the art alkali metal phosphates and silicates are generally represented stoichiometrically as combinations of oxides.

Optionally included are solubles additives and fillers suspended in solution.

The present invention also relates to a process for producing such solutions by stirring corresponding aqueous alkali hydrogen phosphate solutions into aqueous alkali silicate solutions.

The alkali silicates preferably used are sodium and potassium silicates which, for example, may already be in the form of solutions and may contain normal impurities. It is preferred to use solutions of sodium silicate having an $Na_2O:SiO_2$ molar ratio of from 1:1.6 to 1:2.4.

In the context of the present invention, alkali hydrogen phosphates are the known acid alkali salts of phosphoric acid as well as the corresponding pyrophosphates which are obtainable both in the crystalline form and in the soluble glasslike form.

It is preferred to use the acid Na- and K-salts of phosphoric acid and particularly preferred to use the corresponding potassium salts, $K_4P_2O_7$ and $K_2HPO_4$ are even more preferred.

The particularly preferred use of dipotassium hydrogen phosphate is altogether surprising because acid salts are known to have a particularly pronounced gelling effect upon aqueous alkali silicates.

In the $K_2O/Na_2O/P_2O_5/SiO_2/H_2O$-system gelation and flocculation processes occur in ranges above and below the concentration range set forth by the present invention. The fact that incompatibilities such as these in the system are not dependent primarily upon an increasing concentration of phosphate is shown by the Comparison Examples, in which the phosphate concentration range is below the range according to the present invention.

For example, a 40% $K_2HPO_4$ solution may be mixed in a ratio of 1:1 with 44% sodium silicate solution having a molar ratio of $SiO_2:Na_2O$ of 2:1, to form a clear storable solution. The addition of more sodium silicate solution, which is equivalent to reducing the concentration of $P_2O_5$ below the range claimed in accordance with the present invention, results in instability in storage through gelation.

The hydrogen phosphate and the alkali silicate may be combined in any order. However, the aqueous phosphate solution is preferably introduced into the aqueous silicate solution. In this connection, the temperature should generally be between room temperature and a temperature below the boiling point of the homogeneous solution formed.

The stable solutions according to the present invention may optionally contain various soluble additives such as those which influence the stability, viscosity, hardening and burning properties of the plastics materials produced using the solutions according to the present invention. Examples of such additives include soluble inorganic salts such as alkali borates, alkali zincates, alkali chromates, alkali fluoborates; soluble salts of ammonia, hydrazine, guanidine, guanamine, such as guanidine carbonate; soluble polyols, such as glycerol, pentaerythritol, cane sugar, glucose, fructose and formose; and alkali-soluble polymers, such as maleic acidstyrene copolymers. The quantity of such additives should generally not exceed 30%, by weight, of the total solids content of the solutions, and preferably should range from 0.5 to 10%.

Inert fillers may also be added to the stable solutions or to the individual silicate and phosphate solutions before they are mixed. The fillers in question may be either inorganic or organic provided they are inert with respect to alkali silicate solutions. Examples of such fillers include zeolites, mixed silicates, calcium silicates, aluminum silicate, glass powder, hollow glass beads, sawdust, ground shale, hollow polymer beads and melamine resin powder.

The solutions according to the present invention may be used as fire-retarding coating compositions. They are particularly suitable for use as the inorganic component in the manufacture of organic/inorganic plastics, as known, for example from German Auslegeschrift No. 2,325,090 (U.S. Ser. No. 469,253) the disclosure of which is herein incorporated by reference and contribute towards improving the burning properties of such plastics.

The invention is illustrated by the following Examples in which all the percentages represent % by weight, unless otherwise indicated.

EXAMPLE 1

500 parts, by weight, of a 40% aqueous dipotassium hydrogen phosphate solution are introduced at room temperature into 500 parts, by weight, of a 44% aqueous sodium silicate solution having an $SiO_2:Na_2O$ ratio of 2.0. The homogeneous solution formed is stable in storage and has the following composition:

$K_2O$ = 10.8 percent $Na_2O$ = 7.5 percent
$P_2O_5$ = 8.2 percent
$SiO_2$ = 14.5 percent Several mixtures having different alkali silicate/dipotassium hydrogen phosphate ratios were prepared in accordance with Example 1. The results of these tests are set out in Table I below. Corresponding mixtures outside the ranges in accordance with the present invention give non-homogeneous solutions, as shown in Examples 6 to 8.

TABLE I

| Example | $K_2O$ (%, by weight) | $Na_2O$ (%, by weight) | $P_2O_5$ (%, by weight) | $SiO_2$ (%, by weight) | $(K_2O+Na_2O)$: | $(P_2O_5+SiO_2)$ | Solids content (%, by weight) | Property of the solution |
|---|---|---|---|---|---|---|---|---|
| 1 | 10.8 | 7.5 | 8.2 | 14.5 | 1 | 1.2 | 41 | homogeneous |
| 2 | 10.3 | 6.8 | 7.8 | 18.5 | 1 | 1.5 | 45 | homogeneous |
| 3 | 10.8 | 8.2 | 8.2 | 16.1 | 1 | 1.2 | 44 | homogeneous |
| 4 | 9.7 | 6.4 | 7.3 | 12.4 | 1 | 1.2 | 35.6 | homogeneous |
| 5 | 7.4 | 9.2 | 5.6 | 17.8 | 1 | 1.4 | 40 | homogeneous |
| 6 | 5.4 | 11.3 | 4.1 | 21.8 | 1 | 1.6 | 43 | non-homogeneous |
| 7 | 2.1 | 13.6 | 1.5 | 26.4 | 1 | 1.8 | 44 | non-homogeneous |
| 8 | 18.2 | 3.4 | 13.7 | 6.6 | 1 | 0.9 | 42 | non-homogeneous |

EXAMPLE 9

Following the procedure of Example 12 of German Offenlegungsschrift 2,325,090, two foam blocks were produced in accordance with the following formulation:

100 parts, by weight, of prepolymer A[1]
10 parts, by weight, of Witaclor 63 [2]
1 part, by weight, of stabilizer "L 5340" [3]
3.6 parts, by weight, of dodecyl benzene sulphonic acid
1 part, by weight, of triethylamine
50 parts, by weight, of trichlorofluoromethane
400 parts, by weight, of "waterglass"

1. produced in accordance with German Offenlegungsschrift 2,325,090 from polyisocyanate component and n-butanol started polyethylene oxide monohydricalcohol having a molecular weight of 1145
2. a chlorinated paraffin produced by Dynamit Nobel AG, chlorine content: 62–64%, by weight, viscosity at 20° C: approx. 40,000 cP
3. a polyether polysiloxane produced by Union Carbide Corp. The only difference between the foam blocks produced lies in the "waterglass" used.

Foam (a) contains 44% sodium silicate having an $SiO_2:Na_2O$ ratio of 2 as the "waterglass" component, whereas foam (b) contains the corresponding quantity of a solution according to the present invention (cf. Example 1).

Slices were cut from both blocks and subjected to the Epiradiateur Test described in Gummi, Asbest, Kunststoffe, 5/1974, page 331.

After this test, foam (a) is awarded the rating M-2 and foam (b) the rating M-1, i.e. no ignition was observed on test specimens of foam (b) under these test conditions.

What is claimed is:
1. Aqueous solutions of alkali silicates and alkali hydrogen phosphates comprising:
   from about 4 to 18%, by weight, of $K_2O$
   from about 2 to 11%, by weight, of $Na_2O$
   from about 3 to 10%, by weight, of $P_2O_5$
   from about 12 to 21%, by weight, of $SiO_2$ based on the sum total of the constituents including water, wherein the ratio of the sum totals of the parts by weight, of $(K_2O+Na_2O) : (P_2O_5+SiO_2)$ is from about 1:0.9 to about 1:1.7 and has a solids content of from about 30 to about 50%, by weight.

2. The solutions of claim 1 which additionally contain soluble additives and fillers suspended in solution.

3. The solutions of claim 2 wherein said additives and fillers are present in amounts ranging from 0 to 30% by weight of the total solids content of the solutions.

4. The solutions of claim 3 wherein the range is from 0.5 to 10%.

5. The solutions of claim 1 wherein the solids content is from 40 to 45%.

6. The solutions of claim 1 wherein said alkali silicate is selected from the group consisting of sodium silicates and potassium silicates.

7. The solutions of claim 6 wherein said sodium silicate has an $Na_2O:SiO_2$ molar ratio of from 1:1.6 to 1:2.4.

8. The solutions of claim 1 wherein the alkali hydrogen phosphate is an alkali salt of pyrophosphoric acid.

9. The solutions of claim 8 wherein the alkali hydrogen phosphate is selected from the group consisting of dipotassium hydrogen phosphate and potassium pyrophosphate.

10. A process for producing aqueous alkali silicate hydrogen phosphate solutions of claim 1 comprising mixing an aqueous alkali hydrogen phosphate solution with an aqueous alkali silicate solution.

11. The process of claim 10 wherein an aqueous alkali hydrogen phosphate solution is introduced into an aqueous alkali silicate solution.

* * * * *